US008351348B2

(12) United States Patent
Mack-Crane et al.

(10) Patent No.: US 8,351,348 B2
(45) Date of Patent: Jan. 8, 2013

(54) VALUE-ADOPTION AND VALUE-TRANSLATION FOR AUTOMATIC PROVISIONING OF PORT PARAMETERS

(75) Inventors: T. Benjamin Mack-Crane, Downers Grove, IL (US); Linda Dunbar, Plano, TX (US); Lucy Yong, McKinney, TX (US); Robert Sultan, Somers, NY (US)

(73) Assignee: Futurewei Technologies, Inc., Plano, TX (US)

( * ) Notice: Subject to any disclaimer, the term of this patent is extended or adjusted under 35 U.S.C. 154(b) by 1119 days.

(21) Appl. No.: 12/252,698

(22) Filed: Oct. 16, 2008

(65) Prior Publication Data

US 2009/0180389 A1 Jul. 16, 2009

Related U.S. Application Data

(60) Provisional application No. 61/020,293, filed on Jan. 10, 2008.

(51) Int. Cl.
*H04L 12/28* (2006.01)
*G06F 15/177* (2006.01)

(52) U.S. Cl. ............. 370/254; 370/395.53; 709/220
(58) Field of Classification Search ............... None
See application file for complete search history.

(56) References Cited

U.S. PATENT DOCUMENTS

| 7,380,025 | B1 * | 5/2008 | Riggins et al. ............... 710/8 |
| 2004/0095897 | A1 * | 5/2004 | Vafaei ............... 370/254 |
| 2006/0120517 | A1 * | 6/2006 | Moon et al. ............... 379/45 |
| 2007/0127464 | A1 * | 6/2007 | Jain et al. ............... 370/389 |
| 2008/0117902 | A1 * | 5/2008 | Vinneras ............... 370/389 |
| 2008/0240104 | A1 * | 10/2008 | Villait et al. ............... 370/392 |
| 2010/0290345 | A1 * | 11/2010 | Gero et al. ............... 370/241.1 |

OTHER PUBLICATIONS

IEEE Standard, 802.1ab™, "IEEE Standard for Local and Metropolitan Area Networks, Station and Media Access Control Connectivity Discovery," IEEE Computer Society, May 6, 2005, 172 pages.
IEEE Standard, 802.1ad™, "IEEE Standard for Local and Metropolitan Area Networks, Virtual Bridged Local Area Networks, Amendment 4: Provider Bridges," IEEE Computer Society, May 26, 2006, 73 pages.
Sultan, Robert, et al., Patent Application entitled "Fault Verification for an Unpaired Unidirectional Switched-Path," filed Mar. 27, 2008, U.S. Appl. No. 12/056,405.

(Continued)

*Primary Examiner* — Marcus R Smith
(74) *Attorney, Agent, or Firm* — Conley Rose, P.C.; Grant Rodolph; Rayhao Chung

(57) ABSTRACT

A network component comprising at least one processor configured to implement a method comprising receiving a message comprising a node's data value from the node, determining whether a local data value has been assigned, and adopting the node's data value as the local data value when the local data value has not been assigned. Also disclosed is a network component comprising a plurality of ports each configured to couple to a node via a link, a memory configured to store a port data value associated with at least some of the ports, and a processor coupled to the memory and the ports, wherein the processor is configured to access a node's data value in a message and adopt the node's data value as the port data value.

23 Claims, 5 Drawing Sheets

OTHER PUBLICATIONS

Sultan, Robert, et al., Patent Application entitled "Data Communications Network for the Management of an Ethernet Transport Network," filed Mar. 28, 2008, U.S. Appl. No. 12/057,426.

Sultan, Robert, et al., Provisional Patent Application entitled "System for Connectivity Fault Management in Networks Supporting Both Connectionless and Connection-Oriented Traffic," filed Apr. 27, 2007, U.S. Appl. No. 60/914,432.

Sultan, Robert, et al., Patent Application entitled "Verifying Management Virtual Local Area Network Identifier Provisioning Consistency," filed Mar. 28, 2008, U.S. Appl. No. 12/057,566.

* cited by examiner

VALUE-ADOPTION AND VALUE-TRANSLATION FOR AUTOMATIC PROVISIONING OF PORT PARAMETERS

CROSS-REFERENCE TO RELATED APPLICATIONS

The present application claims priority to U.S. Provisional Patent Application No. 61/020,293 filed Jan. 10, 2008 by Sultan et al. and entitled "Method of Value-Adoption and Value-Translation for a DCN VID Value Learned from a Neighbor Bridge via LLDP," which is incorporated herein by reference as if reproduced in its entirety.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Modern communication and data networks are comprised of nodes that transport data through a network. The nodes may include routers, switches, bridges, and other components that transport the individual data frames and/or packets through the network. Certain parameters related to data communication over a link must be provisioned consistently for the ports in the nodes bounding the link. For example, providing management connectivity, such as a Data Communication Network (DCN) management communication channel over a link is desirable. Furthermore, consistent provisioning of DCN parameters at the ports bounding the link is important to ensuring that management connectivity functions properly in such networks.

SUMMARY

In a first aspect, the disclosure includes a network component comprising at least one processor configured to implement a method comprising receiving a message comprising a node's data value from the node, determining whether a local data value has been assigned, and adopting the node's data value as the local data value when the local data value has not been assigned.

In a second aspect, the disclosure includes a network component comprising a plurality of ports each configured to couple to a node via a link, a memory configured to store a port data value associated with at least some of the ports, and a processor coupled to the memory and the ports, wherein the processor is configured to access a node's data value in a message and adopt the node's data value as the port data value.

In a third aspect, the disclosure includes a network comprising a plurality of nodes communicating with a management entity using a management VLAN identified by a management VID, wherein the nodes exchange messages comprising the management VID, and wherein the nodes adopt the management VID in the messages when the nodes are not provisioned with the management VID.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

At least some embodiments of the disclosure involve management, e.g. DCN, traffic in a hybrid network environment that supports connection-oriented traffic and connectionless traffic (e.g., traffic based on VLANs). For example, connection-oriented frame transfers may be based on PBB-TE and connectionless frame transfers may be based on PBB. DCN traffic is propagated as connectionless traffic associated with a Management VLAN, identified by a DCN VID. In an Ethernet embodiment, the DCN VID may be a VID that is temporarily provisioned or globally reserved for DCN traffic. The DCN traffic may correspond to Connectivity Fault Management (CFM) messages, Operation, Administration, Management, and Provisioning (OAM&P) messages, configuration and backup files, billing data, software downloads, or other DCN traffic. To verify the DCN VID is provisioned compatibly throughout the network, embodiments support exchanging DCN VID information between adjacent nodes. For example, a node may exchange a LLDPDU with each neighboring node. In some embodiments, the LLDPDU is formatted according to the link layer discovery protocol (LLDP), which is defined in Institute of Electrical and Electronic Engineers (IEEE) Standard 802.1AB. By broadcasting DCN VID values, DCN VID values can be adopted by nodes lacking such information and discrepancies in DCN VID values between nodes can be flagged. Moreover, a translation method is disclosed in which differing DCN VID values may be maintained at adjacent nodes, perhaps eliminating the need for corrective action. Various VID translation methods are disclosed.

Figure 1:
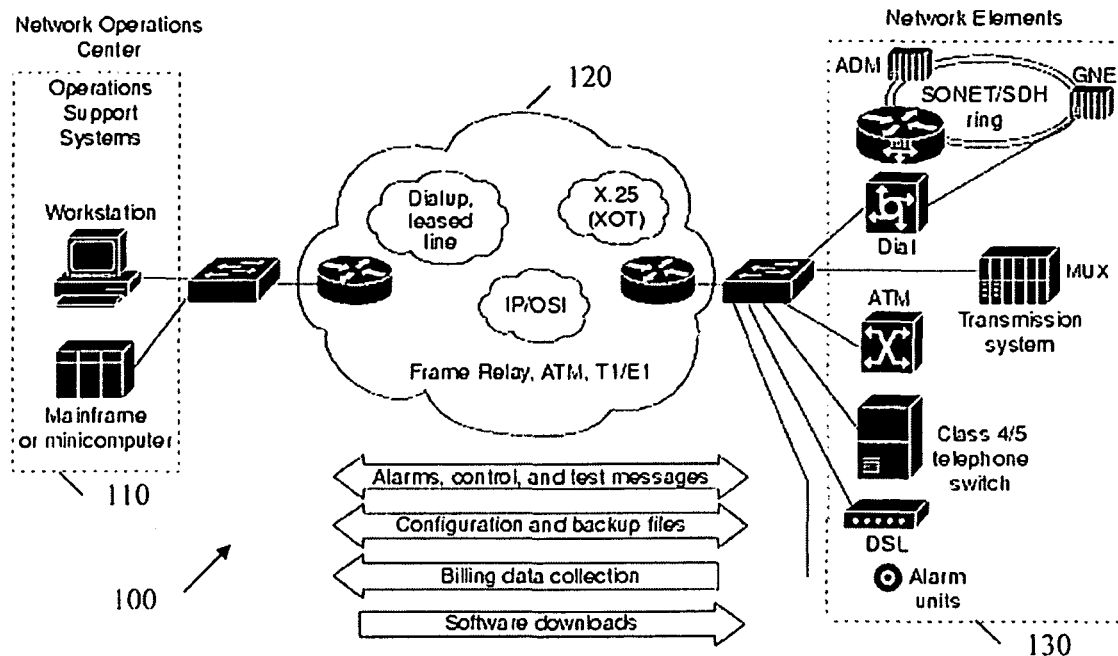
FIG. 1 is a schematic diagram of a system with a Data Communications Network (DCN).

FIG. 1 is a schematic diagram of an embodiment of a system 100 with a DCN 120, and FIG. 1 is provided to better understand the use of the term DCN in the disclosure. In FIG. 1, a telecommunications service provider may deploy network elements 130, such as Synchronous Optical Network (SONET) or Synchronous Digital Hierarchy (SDH) components. The DCN 120 is deployed to support management connectivity between an Operations Support System (OSS) 110 and individual network elements 130, which comprise a Transport Network. The DCN 120, which may be configured according to International Telecommunication Union Standardization Sector (ITU-T) G.7712/Y.1703, makes it unnecessary to provide direct connections between the OSS 110 and each individual network element 130 of the transport network. The DCN 120 requires the deployment of a routing protocol such as Open Systems Interconnect (OSI) routing or Internet Protocol (IP) routing in the network elements 130. Information carried by the DCN 120 includes OAM&P messages, configuration and backup files, billing data, and software downloads.

In at least some embodiments, an instance of a bridged VLAN, known as a Management VLAN, supports connectivity between a Network Management System (NMS) and the bridging devices associated with an Ethernet Transport Network, which may be configured according to IEEE Draft Standard 802.1Qay. The role of the VLAN with respect to the Ethernet Transport network is similar to the role of the DCN 120 in a traditional (e.g., SONET/SDH) telecommunications network. The VLAN used for this purpose may be called an Ethernet DCN.

Embodiments provide an efficient method of interconnecting a NMS with Ethernet Transport Devices, such as 802.1Qay compliant bridges, by eliminating the need to provide a direct connection between the NMS and each individual Ethernet Transport Device. This is similar to the efficiency provided by a DCN in a SONET network. A particular advantage of using a VLAN for this purpose is that the bridges natively support VLANs. This makes it unnecessary to introduce a special purpose data channel to the bridge ports (i.e., ports on physical links or LANs) to support the DCN function.

Figure 2:
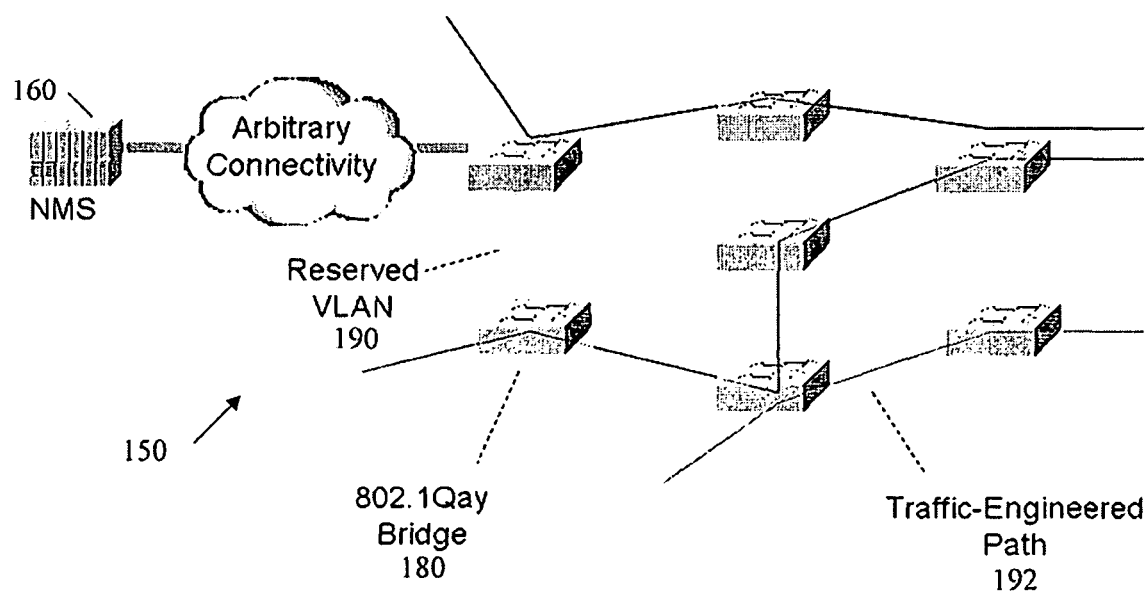
FIG. 2 is a schematic diagram of an embodiment of an Ethernet Transport Network (ETN) managed via an Ethernet DCN.

FIG. 2 is a schematic diagram of an embodiment of an ETN 150 managed using a reserved VLAN 190 that acts as an Ethernet DCN. In at least some embodiments, the ETN 150 follows the IEEE Draft Std. 802.1Qay protocol, which specifies the means by which 802.1Qay devices 180 may be used to support traffic-engineered paths. A network deploying such paths can transport data in a manner similar to a SONET or SDH network. In FIG. 2, the ETN 150 is managed by a NMS 160 in a manner similar to the way in which a SONET-based transport network is managed by the OSS 110. As in the case of the SONET-based transport network, it is useful to avoid the direct interconnection between the NMS 160 and each device 180 within the ETN 150. It is observed that the 802.1Qay-compliant devices 180 can concurrently support instances of VLANs and instances of traffic-engineered paths 192. In FIG. 2, DCN-type services in the ETN 150 are provided using the reserved VLAN 190, which interconnects the NMS 160 with ETN devices 180. In this manner, direct connection of the NMS 160 with each individual device 180 is unnecessary and an additional network technology need not be introduced to support the Ethernet DCN. This can be contrasted with the use of a traditional DCN 120 that requires the introduction of a layer three protocol, such as OSI routing or IP routing, in the network elements 130.

In general, the reserved VLAN 190 of the ETN 150 can be used to carry the same types of information as the traditional DCN 120, which includes OAM&P (such as alarm, control, and test messages), configuration and backup files, billing data, and software download. In addition, the reserved VLAN 190 may be useful in carrying CFM information related to traffic-engineered Ethernet paths. For additional information regarding CFM services in hybrid communication networks, reference is made to U.S. patent application Ser. No. 12/056, 405 filed Mar. 27, 2008 by Sultan et al. and entitled "Fault Verification for an Unpaired Unidirectional Switched-Path" and to U.S. Provisional Patent Application No. 60/914,432 filed Apr. 27, 2007 by Sultan, et al. and entitled "System for Performing Connectivity Fault Management in Networks Supporting Both Connectionless and Connection-Oriented Traffic", which are herein incorporated by reference as if reproduced in their entirety.

The reserved or provisioned DCN VLAN 190 enables connectivity among all devices 180 in the entire ETN 150. The PBB-TE protocol requires all network connectivity paths to be explicitly created, for example instead of using the Spanning Tree Protocol. By creating an Ethernet DCN, all the nodes/bridges in the PBB-TE network may be ensured to be reachable from any specific node. In such case, various management functions can be supported. For example, the Ethernet DCN can support remote access from any PBB-TE nodes to other PBB-TE nodes. In this manner, an operator at one location can remotely login to another node to perform OAM&P functions. Additionally or alternatively, the reserved VLAN 190 may support segment connectivity testing or other diagnostic operations, As an example, any intermediate node can test its connectivity to other nodes along ESP paths. Using such connectivity testing faults can be isolated along any PBB-TE segment.

In accordance with some embodiments, the reserved or provisioned DCN VLAN 190 is associated with a management VID, such as a DCN VID. The management VID may be temporarily provisioned or globally reserved. To ensure consistent provisioning of the DCN VID to the devices 180 of the ETN 150, each device 180 is configured to exchange DCN VID information with neighboring devices. For example, an LLDPDU containing a DCN VID TLV field specifying the locally provisioned DCN VID can be exchanged by each device 180 with its neighbor. In other words, each device 180 may disclose to its neighbor devices whether a DCN VID has been provisioned to the device and, if so, the value of the DCN VID. In this manner, any discrepancies in DCN VID provisioning can be detected and resolved as described herein.

In one embodiment, the exchange of DCN VID values between neighboring bridges of a network may be done as defined by IEEE 802.1AB. IEEE 802.1AB enables Ethernet devices to advertise information about themselves to neighboring network nodes as well as to store advertised information received from other neighboring network nodes. As is understood in the relevant art, LLDP operates in a one-way direction. In other words, LLDPDUs are not exchanged as information requests by one device and responses sent by another device. Thus, a receiving device neither requests nor acknowledges LLDP information received from other devices. Rather, the receiving device stores and updates LLDP information, which is accessible to network administrators.

Figure 3:
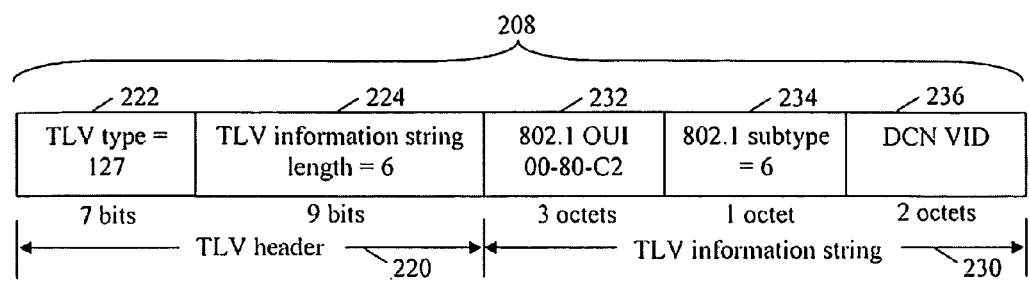
FIG. 3 is a schematic diagram of an embodiment of DCN VID type-length-value (TLV) extension for a Link Layer Discovery Protocol Data Unit (LLDPDU).

The LLDPDUs defined in IEEE 802.1AB have an extensible format that supports optional TLV extensions 208. In an embodiment, one such TLV extension 208 corresponds to a DCN VID TLV. FIG. 3 shows an embodiment of a DCN VID TLV 208, which comprises a TLV header 220 and a TLV information string 230. The TLV header 220 includes an extension type field 222 for identifying TLV extensions, which may be about seven bits in length. The TLV header 220 also includes a TLV information string length field 224 that indicates the length of the TLV information string 230, and which may be about nine bits in length. For the DCN VID TLV 208 embodiment shown in FIG. 3, the TLV information string has a length of about six octets.

Octets 1-3 of the TLV information string 230 correspond to an Organizationally Unique Identifier (OUI) field 232 that identifies the OUI associated with each DCN VID TLV 208. Octet 4 of the TLV information string 230 corresponds to an 802.1 sub-type field 234 (e.g., subtype 6) associated with DCN VID TLVs. Finally, octets 5-6 of the TLV information string 230 correspond to a DCN VID field 236 that contains a DCN VID value. As an example, if a DCN VID has not been provisioned to a node, DCN VID TLVs transmitted from that node contain a zero value or null value (e.g. '0'x) in the DCN VID field 236. If a DCN VID has been provisioned to a node, DCN VID TLVs transmitted from that node contain the value of the provisioned DCN VID in the DCN VID field 236. By advertising the DCN VIDs between nodes of a network, inconsistencies in the provisioning of DCN VIDs can be detected and remedied as described herein. Such inconsistencies could result in the failure of management connectivity to nodes and resulting failure to control the nodes.

For more information on extending IEEE 802.1AB to support new TLV extensions and inclusion of management, e.g. DCN, VIDs in TLVs between nodes, reference is made to U.S. patent application Ser. No. 12/057,566 filed Mar. 28, 2008 by Sultan et al. and entitled "Method of Verifying DCN VID Provisioning Consistency", and U.S. patent application Ser. No. 12/057,190 filed Mar. 27, 2008 by Sultan et al. and entitled "Method of Preventing Transport Leaks and VLAN Usage Conflicts in Hybrid Switching Networks by Extension of the Link Layer Discovery Protocol (LLDP)." These references are incorporated herein by reference as if reproduced in its entirety.

Figure 4:
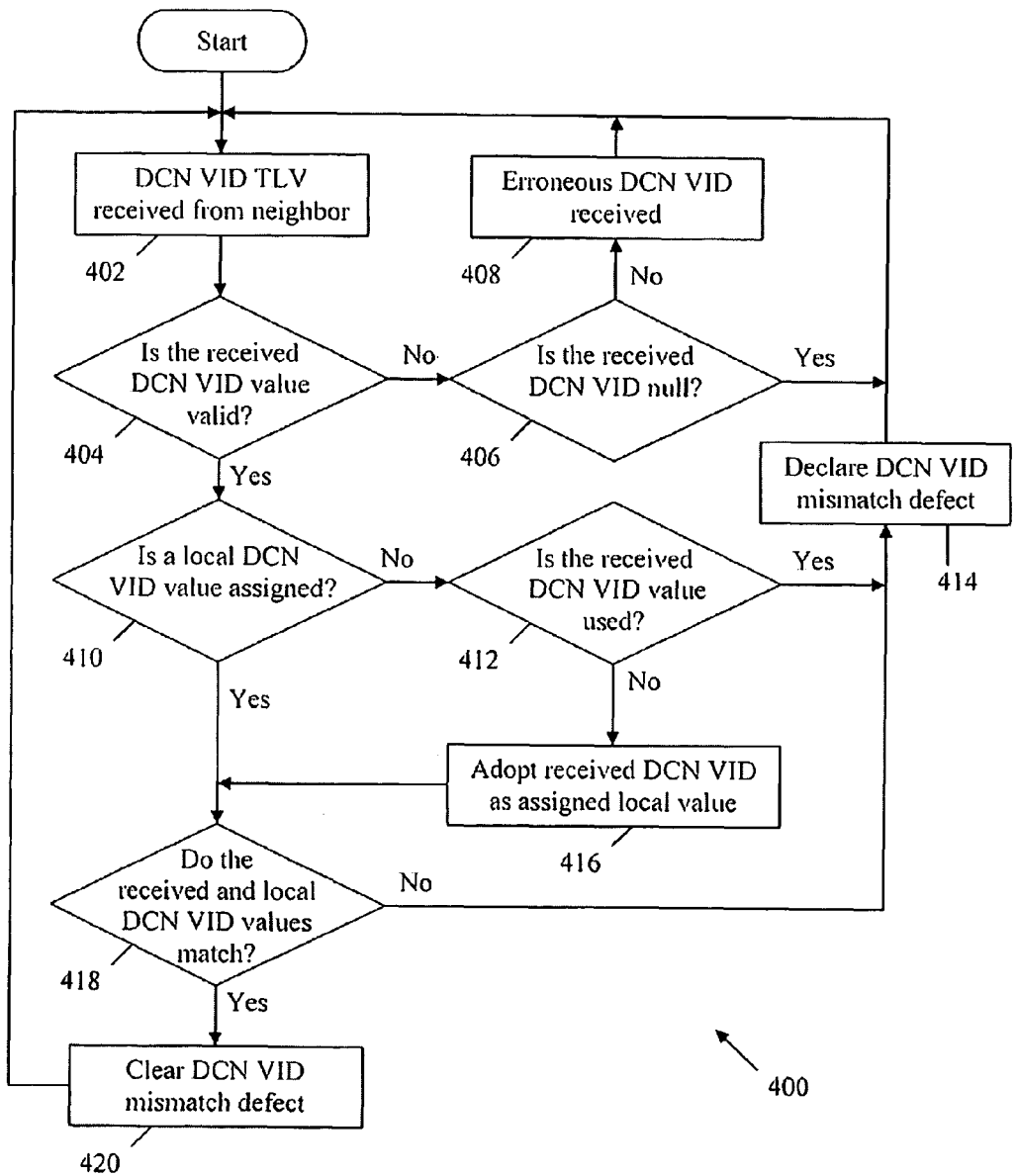
FIG. 4 is a flowchart of an embodiment of a DCN VID value adoption method.

FIG. 4 illustrates a flowchart of the DCN VID value adoption method 400. The method 400 may be implemented, for example, at one of the nodes described herein. The method 400 may begin at block 402 where a TLV comprising a DCN VID is received, for example from a neighboring node. At block 404, a determination may be made as to whether the DCN VID value in the received TLV is valid. In determining the validity of the DCN VID value, a determination may be made as to whether the DCN VID value was received without errors and/or whether the DCN VID value is a valid VID value. If at block 404 it is determined that the DCN VID value in the received TLV is valid, then the method 400 may proceed to block 410, which is discussed below. If at block 404 it is determined that the DCN VID value in the received TLV is not valid, then the method 400 may proceed to block 406 where a determination may be made as to whether the DCN VID) value is a null value. In doing so, a comparison may be made between the DCN VID value and a null value (e.g. '0'x) to determine whether the DCN VID value is a null value. If at block 406 it is determined that the DCN VID value is a null value, then the method 400 may return to block 402. If at block 406 it is determined that the DCN VID value is not a null value, then the method 400 may proceed to block 408 where it is determined that the DCN VID value in the TLV is erroneous. In doing so, the management system may optionally be alerted of the erroneous DCN VID value only once, e.g. immediately, or recurrently upon periodic intervals, and may return to block 402.

Returning to block 410, a determination may be made as to whether there is a locally assigned DCN VID value. The determination as to whether there is a locally assigned DCN VID value may be made, for example, by performing a lookup in a VID table or otherwise analyzing the configuration of the node. A VID table may be a table, stored locally in the node or at a remote location, that comprises a plurality of VIDs and the type of traffic associated with each VIP. An example of a VID table is shown below in Table 1:

TABLE 1

| VID | Traffic |
| --- | --- |
| 1 | PBB |
| 2 | PBB-TE |
| 3 | DCN |
| 4 | PBB |
| 5 | Not Assigned |

If at block 410 it is determined that there is a locally assigned DCN VID value, then the method 400 may proceed to block 418, which is discussed below. If at block 410 it is determined that there is not a locally assigned DCN VID value, then the method 400 may proceed to block 412 where a determination may be made as to whether the received DCN VID value is already used for some other purpose (e.g. that the received VID value is reserved for other purposes, such as PBB or PBB-TE traffic). The determination as to whether the received DCN VID value is already used may be made, for example, by performing a lookup in the VID table or otherwise analyzing the configuration of the node. If at block 412 it is determined that the received DCN VID value is already used for some other purpose, then the method 400 may proceed to block 414, where a DCN VID mismatch may be declared. The management system may optionally be notified of the DCN VID mismatch only once, e.g. immediately, or recurrently upon periodic intervals. The method 400 may then return to block 402.

Returning to block 412, if it is determined that the received DCN VID value is not already used for some other purpose, then the method 400 may proceed to block 416 where the received DCN VID value may be adopted as the local DCN VID value. In doing so, the received DCN VIP value may be recorded into a VIP table or some other indication may be made within the node that the received VID value is associated with a DCN. The method 400 may then proceed to block 418 where a determination may be made as to whether the DCN VID value in the TLV is the same as the local DCN VID value. If at block 418 it is determined that the received DCN VID value is not the same as the local DCN VID value, then the method 400 may returns to block 414, which is discussed above. If at block 418 it is determined that the received DCN VID value is the same as the local DCN VID value, then the method 400 may proceed to block 420 where any DCN VID mismatch defects are cleared. In doing so, a message may optionally be sent to the management system or if messages are already being recurrently sent, such messages may be discontinued. The method 400 may then return to block 402.

Figure 5:
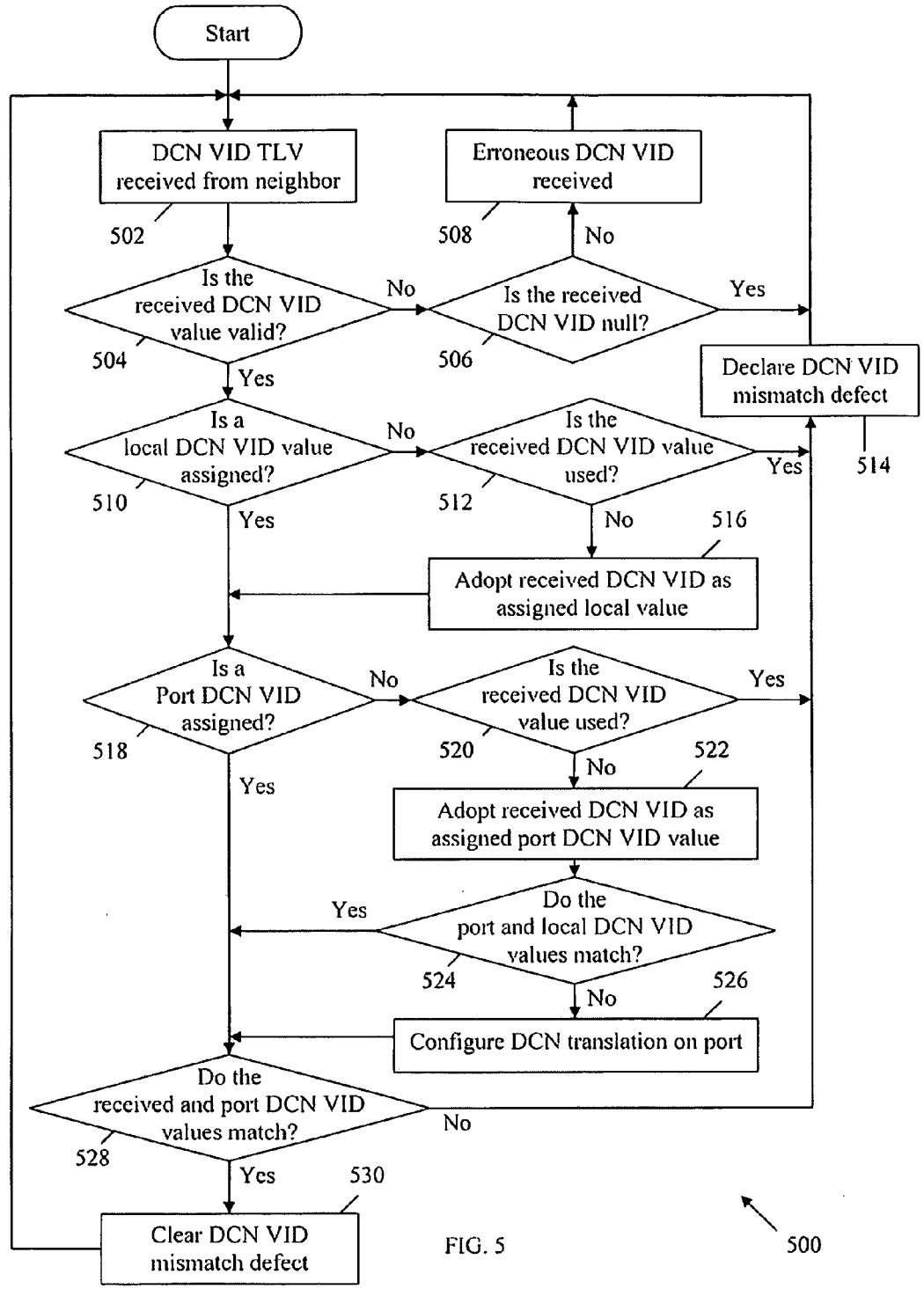
FIG. 5 is a flowchart of an embodiment of a DCN VID value translation method.

FIG. 5 illustrates a flowchart of the DCN VID value translation method 500. The method 500 may be implemented, for example, at one of the nodes described herein. Blocks 502, 504, 506, 508, 510, 512, 514, 516, and 530 of method 500 are substantially similar to blocks 402, 404, 406, 408, 410, 412, 414, 416, and 420, respectively, of method 400 described above. Thus, the flow of method 500 may proceed as described above to block 518 where a determination may be made as to whether a DCN VID value has been assigned to the port upon which the TLV was received. The determination as to whether a DCN VID value has been assigned to the port upon which the TLV was received may be made, for example, by performing a lookup in a Port DCN VID table or otherwise analyzing the configuration of the node. The Port DCN VID table may be a table, stored locally in the node or at a remote location, that comprises a plurality of ports and the DCN VIDs associated with each port. As explained below, the Port DCN VID table may optionally indicate whether translation is required at that port. An example of a Port DCN VID table is shown below in Table 2:

TABLE 2

| Port Number | DCN VID |
|---|---|
| 1 | 12 |
| 2 | 16 |
| 3 | 10 |
| 4 | 12 |
| 5 | 12 |

If at block 518 it is determined that there is a DCN VID value assigned to the port upon which the TLV was received, then the method 500 may proceed to block 528, which is discussed below. If at block 518 it is determined that there is not a DCN VID value assigned to the port upon which the TLV was received, and then the method 500 may proceed to block 520.

At block 520, a determination may be made as to whether the received DCN VID value is already used for some other purpose on the receiving port. A determination may be made as to whether the received DCN VID value is already used, for example, by performing a lookup in a VID table, or otherwise analyzing the configuration of the node. If at block 520 it is determined that the received DCN VID value is already used for some other purpose on the receiving port, then the method 500 may returns to block 514, which is described above. Returning to block 520, if it is determined that the received DCN VID value is not already used for some other purpose on the receiving port, then the method 500 may proceed to block 522, where the method 500 adopts the received DCN VID value as the DCN VID value for the port upon which the TLV was received. In doing so, one or more entries in the Port DCN VID table may be created and/or modified to indicate the DCN VID number associated with the port number, or otherwise indicate that the received VID value is associated with a DCN. The method 500 may then proceed to block 524.

At block 524 a determination may be made as to whether the port DCN VID value and the local DCN VID values are identical. In doing so, a comparison may be made between the local DCN VID value and the DCN VID value associated with the port to determine whether they are the same VID value. If at block 524 a determination is made that the port DCN VID value and the local DCN VID values are identical, then no translation is needed on that port, and the method 500 may proceed to block 528, which is discussed above. However, if at block 524 a determination is made that the port DCN VID value and the local DCN VID values are not identical, then the method 500 may proceed to block 526, where port DCN VID translation is configured. Specifically, at block 526 an indication may be made that DON VID translation on the associated port may be necessary, and may be implemented using one of the translation methods discussed below by provisioning the VID translation table for the port as specified in IEEE Std 802.1ad-2005. Such an indication may be indicated as an entry in the Port DCN VID table, if desired.

The method 500 may then proceed to block 528 where a determination may be made as to whether the received DCN VID value and the port DCN VID values are identical. In doing so, a comparison may be made between the received DCN VID value and the DCN VID value associated with the port to determine whether they are the same VID value. If at block 528 a determination is made that the received DCN VID value and the port DCN VID values are identical, then no DCN VID mismatch exists on that port, and the method 500 may proceed to block 530, which is discussed above. However, if at block 528 a determination is made that the received DCN VID value and the port DOCN VID value are not identical, then the method 500 may return to block 514, which is discussed above.

There are several methods by which DCN VID translation can occur. In one embodiment, each node performs translation for the traffic that it transmits. Specifically, each node translates its DCN VID into the recipients' DCN VID if the recipients' DCN VID, e.g. the DCN VID indicated in the Port DCN VID table, differs from its own DCN VID. The node may subsequently transmit any DCN traffic to the recipient using the recipient's DCN VID. As such, there is no need for the nodes to translate the DCN VIDs in the TLVs they receive because each node receives TLVs comprising their own DCN VIDs. In an alternative embodiment, each node transmits any DCN traffic to the recipient using its own DCN VID. The recipient nodes will subsequently perform translation for the traffic that it receives. Specifically, each node may translate the DCN VIDs it receives into its own DCN VID if the received DCN VID differs from its own DCN VID. Such may be done, for example, using the DCN VID entries in the Port DCN VID table. As such, there is no need to translate the DCN VIDs for the transmitted traffic because each node performs its own translation. In a third embodiment, one of the two neighboring nodes may be designated as the 'translating' node. This selection could be based, for example, on the collating sequence of the nodes' MAC addresses, on the collating sequence of the port MAC addresses of the communicating nodes' ports, or some similar algorithm that would deterministically choose one of the two nodes. Such an embodiment may be useful, for example, at central portions or at the edge of a network.

In an embodiment, the nodes may implement a security challenge prior to adopting and/or translating the DCN VID. Specifically, the nodes may implement an authentication and/or authorization challenge prior to implementing the DCN VID adoption and/or translation, thereby reducing or eliminating the possibility of network attacks. Several authentication and/or authorization challenges are known in the art, and any suitable authentication and/or authorization challenge may be used for the purposes described herein.

The methods described herein may be applied to scenarios other than those described herein. For example, the methods described herein may be applied to any management data, VID value, or other data structure or value where consistent configuration and provisioning is needed. In a specific embodiment, the methods described herein may be applied to any situation or network scenario in which information needed to access a particular node (for example, the address of a server) is propagated to substantially all nodes in the network having connectivity to that server. In addition, the methods described herein may be implemented using protocols other than LLDP. For example, a protocol may be developed specifically for the purpose of distributing the DCN VID value, the NMS IP Address, or similar information from the NMS, or other point of provisioning to all other nodes in a network. Finally, the nodes described herein are not limited to Ethernet bridges, but may be any network device, including bridges, switches, routers, and other communications devices.

In a specific example, the methods described herein may be applied to the adoption of traffic class priorities. IEEE's Audio/Video Bridging (AVB) recommends the same traffic class priority value be used throughout an AVB network for specified Class A and Class B traffic classes. The value adoption method may be used to provide plug-and-play operation when Class A or Class B priorities other than the specified defaults are used in an AVB network. In a specific embodiment, the occurrences of "DCN VID" in FIGS. 4 and 5 and the accompanying description may be substituted with "traffic class priority" to provide a method for adopting a priority value to be associated with a specific traffic class, although the present disclosure should not be limited as such.

Finally, the "assigned" value described above may indicate that a value has been explicitly associated with a node or port (e.g., bridge) by provisioning, or a value that has been adopted by a node or port as the result of value adoption. In some situations, it is possible that node A will adopt the value of node B, and then node A discovers that such is inconsistent with node C. This may happen, for example, if the attribute was provisioned with different values at different points in the network. In such a case, the inconsistency may be reported via NMS or translation performed, depending on the specific attribute.

Figure 6:
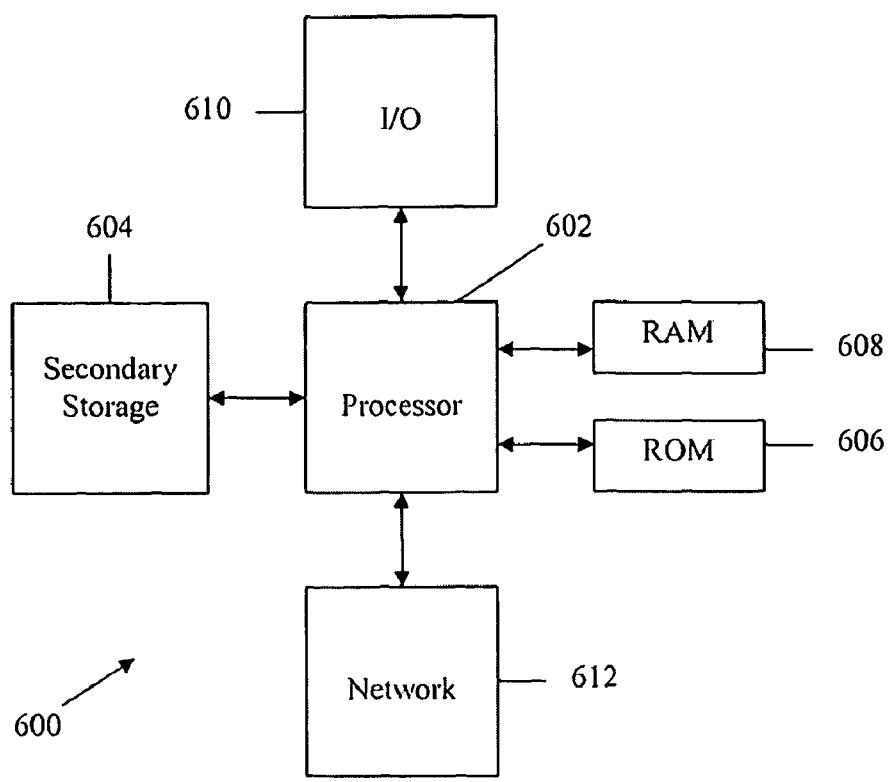
FIG. 6 is a schematic diagram of an embodiment of a general-purpose network component.

The components and methods described above may be implemented on any general-purpose network component, such as a computer, router, switch, or bridge, with sufficient processing power, memory resources, and network throughput capability to handle the necessary workload placed upon it. FIG. 6 illustrates a typical, general-purpose network component suitable for implementing one or more embodiments of a node disclosed herein. The network component 600 includes a processor 602 (which may be referred to as a central processor unit or CPU) that is in communication with memory devices including secondary storage 604, read only memory (ROM) 606, random access memory (RAM) 608, input/output (I/O) devices 610, and network connectivity devices 612. The processor 602 may be implemented as one or more CPU chips.

The secondary storage 604 is typically comprised of one or more disk drives or tape drives and is used for non-volatile storage of data and as an over-flow data storage device if RAM 608 is not large enough to hold all working data. Secondary storage 604 may be used to store programs that are loaded into RAM 608 when such programs are selected for execution. The ROM 606 is used to store instructions and perhaps data that are read during program execution. ROM 606 is a non-volatile memory device that typically has a small memory capacity relative to the larger memory capacity of secondary storage 604. The RAM 608 is used to store volatile data and perhaps to store instructions. Access to both ROM 606 and RAM 608 is typically faster than to secondary storage 604.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a plurality of ports;
a memory configured to store a first port's management identifier associated with a first one of the plurality of ports, wherein the first port is coupled to a neighboring node; and
a processor coupled to the memory and configured to:
receive an Open Systems Interconnect (OSI) layer 2 message comprising a neighboring node's management identifier, wherein the neighboring node's management identifier is provisioned to the neighboring node but is not provisioned to the network component, wherein the neighboring node is provisioned to a virtual network identified by the neighboring node's management identifier; and
adopt the neighboring node's management identifier as the first port's management identifier if a value has not been locally assigned to the first port's management identifier at the time the message is received, wherein the first port's management identifier has not been locally assigned when the first port's management identifier is a null value, and wherein the null value for the first port's management identifier indicates the first port has not been assigned to a second virtual network.

2. The network component of claim 1, wherein the memory is configured to store a local data value for the network component, and wherein the processor is further configured to translate between the local data value and the first port's management identifier when the local data value and the first port's management identifier have different values.

3. The network component of claim 2, wherein the processor is further configured to transmit a second OSI layer 2 message comprising the first port's management identifier on the first port, and wherein translating between the local data value and the first port's management identifier comprises converting from the local data value to the first port's management identifier upon transmitting the second OSI layer 2 message.

4. The network component of claim 2, wherein the processor is further configured to receive a second OSI layer 2 message comprising the first port's management identifier on the first port, and wherein translating between the local data value and the first port's management identifier comprises converting from the first port's management identifier to the local data value upon receiving the second OSI layer 2 message.

5. The network component of claim 2, wherein the processor is further configured to:
transmit a second OSI layer 2 message comprising the first port's management identifier on the first port; and
receive a third OSI layer 2 message comprising the first port's management identifier on the first port, wherein translating between the local data value and the first port's management identifier comprises:
converting from the local data value to the first port's management identifier upon transmitting the second OSI layer 2 message; and
converting from the first port's management identifier to the local data value upon receiving the third OSI layer 2 message.

6. The network component of claim 5, wherein the network component is designated as a translating node.

7. The network component of claim 2, wherein the first port's management identifier is a data communications network (DCN) virtual local area network (VLAN) identifier (VID).

8. A network comprising:
a plurality of virtual local area networks (VLANs);
a first node communicating with a Network Management System (NMS) using a management VLAN identified by a management VLAN identifier (VID), wherein the first node is provisioned to the management VLAN indicated by the management VID; and
a second node coupled to the first node,
wherein the first node transmits an Open Systems Interconnect (OSI) layer 2 messages comprising the management VID to the second node, and
wherein the second node adopts the management VID in the OSI layer 2 messages as the second node's management VID when second node's management VID is a null value, and
wherein having the null value as the second node's management VID indicates the second node has not been provisioned to any VLANs.

9. The network of claim 8, wherein the nodes are configured to invoke a security challenge prior to adopting the management VID, and wherein the management VID is a data communications network (DCN) VID, and wherein the OSI layer 2 messages is a type-length-value (TLV) information string.

10. The network of claim 9, wherein the OSI layer 2 messages are exchanged using the Link Layer Discovery Protocol, and wherein the plurality of nodes are able to support instances of traffic-engineered paths.

11. A method for reducing provisioning activities in a data communications network (DCN), the method comprising:
receiving a broadcast Open Systems Interconnect (OSI) layer 2 message on a port of a first node in the DCN, wherein the broadcast OSI layer 2 message comprises a DCN virtual local area network (VLAN) identifier (VID) that is assigned to a second node in the DCN, but not to the first node, wherein the second node is provisioned to the DCN network identified by the DCN VID; and
adopting the DCN VID as a port's management VID when the port's management VID is a null value at the time the message is received,
wherein having the null value as the port's management VID indicates the port is not associated to the DCN.

12. The method of claim 11, wherein a management entity provisions the DCN VID to a port of the second node, and wherein the broadcast OSI layer 2 message is broadcast by the second node.

13. The method of claim 12, wherein the broadcast OSI layer 2 message does not originate from the management entity.

14. The method of claim 11 further comprising: invoking a security challenge by the first node prior to adopting the DCN VID.

15. The method of claim 14, wherein the broadcast OSI layer 2 message is a Link Layer Discovery Protocol (LLDP) message.

16. A network component comprising:
at least one processor coupled to a memory, wherein the memory comprises instructions that cause the processor to:
receive an Open Systems Interconnect (OSI) layer 2 message comprising a network identifier via a port from an adjacent node, wherein the adjacent node is coupled to the network component;
determine whether a local network identifier for the network component is a null value, wherein the null value for the local network identifier indicates the network component needs to be assigned a network identifier;
adopt the network identifier in the OSI layer 2 message as the local network identifier when the local network identifier is the null value;
determine whether the network identifier in the OSI layer 2 message is valid, wherein the network identifier is valid when the network identifier comprises a valid data value;
determine whether the network identifier in the OSI layer 2 message is the null value; and
raise an alarm when the network identifier in the OSI layer 2 message is not valid and not the null value.

17. The network component in claim 16, wherein the adjacent node and network component are Institute of Electrical and Electronics Engineers (IEEE) 802.1Qay complaint devices, and wherein the instructions further cause the processor to:

determine whether the network identifier in the OSI layer 2 message is reserved for some other purpose; and raise an alarm when the local network identifier has not been assigned and the network identifier in the OSI layer 2 message is not allocated for management services.

18. The network component in claim 16, wherein the instructions further cause the processor to:

determine whether a management network identifier value is assigned to the port, wherein the management network identifier value identifies the virtual network that provides communication to a Network Management System (NMS);

determine whether the network identifier in the OSI layer 2 message is reserved for some other purpose on the port; and raise an alarm when the local network identifier has been assigned, no management network identifier value is assigned to the port, and the network identifier in the OSI layer 2 message is not allocated to the NMS on the port.

19. The network component of claim 18, wherein the instructions further cause the processor to assign the network identifier in the OSI layer 2 message as the management network identifier for the port when the local network identifier has been assigned, the management network identifier value has not been assigned, and the network identifier in the OSI layer 2 message is not reserved for some other purpose on the port.

20. The network component of claim 19, wherein the instructions further cause the processor to:

determine whether the port's management network identifier value is identical to the local network identifier; and configure a translation on the port when the port management network identifier is not identical to the local network identifier, wherein the translation provisions a virtual local area network (VLAN) identifier (VID) translation table that maps the port management network identifier to the local network identifier value as specified in Institute of Electrical and Electronics Engineers (IEEE) 802.1ad.

21. The network component of claim 16, wherein the instructions further cause the processor to:

determine whether a management network identifier value is assigned to the port, wherein the management network identifier value identifies the virtual network that provides communication to the NMS;

determine whether the network identifier in the OSI layer 2 message is identical to the port's management network identifier value; and clear any alarms when the network identifier in the OSI layer 2 message is assigned to the port and is identical to the port's management network identifier value.

22. The network component of claim 21, wherein the instructions further cause the processor to raise an alarm when the port's management network identifier value is not null and the network identifier in the OSI layer 2 message is not identical to the port's management network identifier value.

23. The network component of claim 16, wherein the network identifier from the adjacent node is a data communications network (DCN) VID.

* * * * *